Patented Apr. 12, 1932

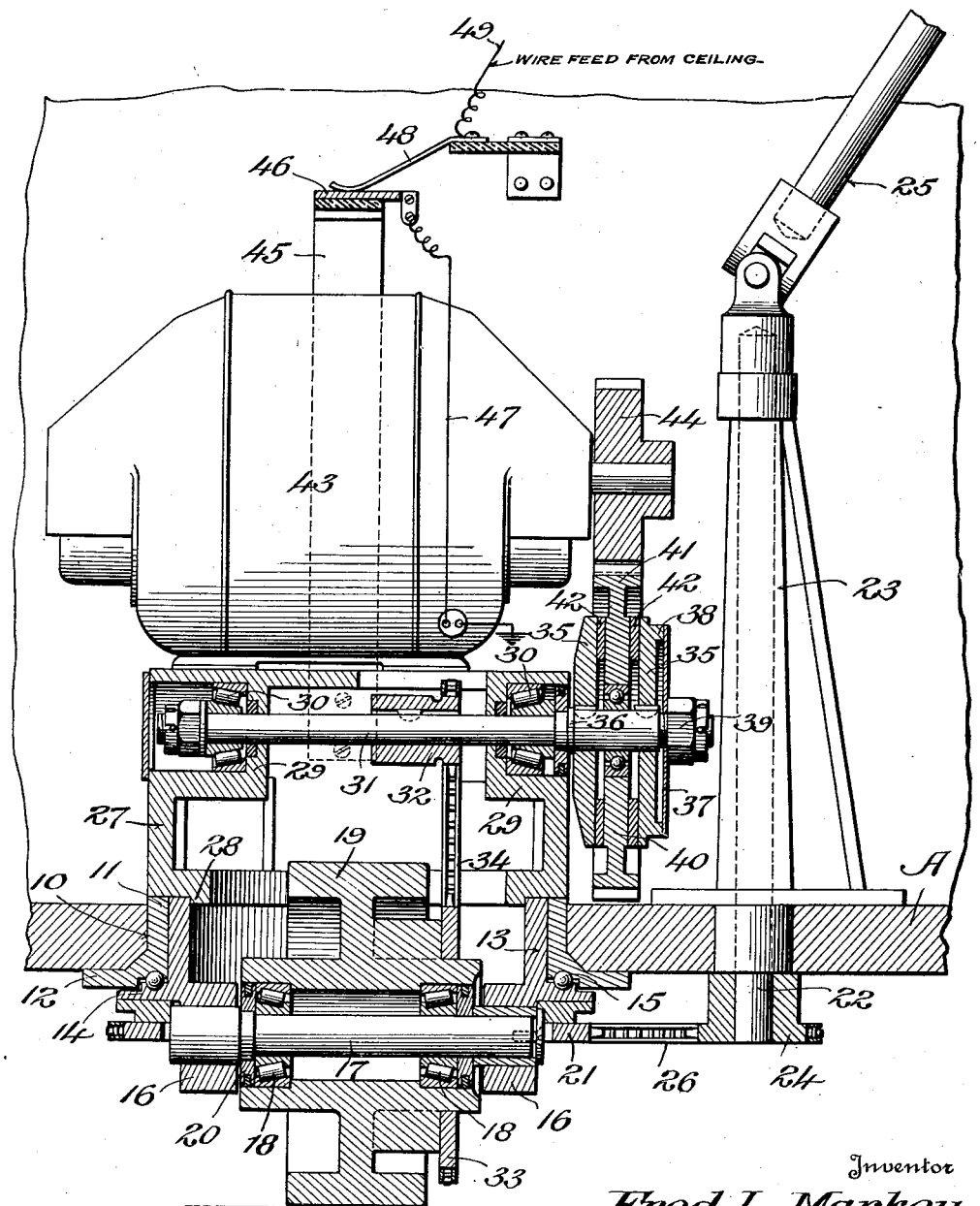

1,853,738

UNITED STATES PATENT OFFICE

FRED L. MARKEY, OF LAWRENCE, MASSACHUSETTS, ASSIGNOR TO DODGEM CORPORATION, OF LAWRENCE, MASSACHUSETTS, A CORPORATION OF MASSACHUSETTS

STEERING WHEEL DRIVE MECHANISM FOR AMUSEMENT CARS

Application filed January 25, 1930. Serial No. 423,471.

This invention relates to an improved steering wheel drive mechanism for amusement cars of the type illustrated for example in Stoehrer et al. Patents Nos. 1,373,108, 1,467,959 and 1,478,979, and has for its general object to provide a novel combination and arrangement of parts according to which the weight of the drive unit is concentrated above the combined steering and traction wheel, and the drive unit as an entirety is rotatable for steering purposes.

Another object of the invention is to provide a front wheel drive mechanism of strong and durable construction thoroughly capable of withstanding the harsh usage to which such mechanisms are subjected in use, and which at the same time is of exceptionally simple design and involves the employment of a minimum number of parts which are relatively cheap and easy to produce and assemble.

With the additional object in view of providing a front wheel drive mechanism which is compact in assembly and thoroughly reliable and efficient in use, the invention consists in the novel features of construction, combination and arrangement of parts as will be hereinafter more fully described, illustrated in the accompanying drawing and defined in the appended claims.

In the drawing, the figure is a vertical sectional view through a front wheel drive mechanism constructed in accordance with the invention.

At A in the drawing is illustrated the base of an amusement car which may be of any desired type, the type illustrated, for example, in the aforesaid Stoehrer et al. patents wherein a seat for the occupant or occupants of the car is provided at the rear of the base and a steering wheel is provided in front of the seat.

In accordance with the present purpose of utilizing the front supporting wheel or caster of the car as both a traction and steering wheel, and of disposing the weight of the drive mechanism directly above said wheel, thereby to simplify the general construction of the car and to provide a more uniform distribution of weight over the base A, which is extremely desirable, the said base A is provided at the front thereof with a relatively large hole 10 and in this hole is arranged a bearing sleeve or collar 11 provided, preferably, at its lower end, with an annular, outwardly directed flange 12 which engages the under face of the base A and thereby serves to limit upward movement of the sleeve or collar through the hole 10 and at the same time to assist in holding said sleeve or collar with the axis of its bore disposed vertically. If desired, suitable fasteners may be engaged through the flange 12 and into the base A to secure the sleeve or collar 11 in assembly with the base and against rotation with respect thereto.

Snugly fitted within the sleeve or collar 11, for rotation with respect thereto, is a ring 13 provided with at its lower end an outwardly directed annular flange 14 which underlies the flange 12 and cooperates therewith to limit upward movement of said ring through said sleeve or collar, balls 15 or other suitable anti-friction means preferably being interposed between the flanges 12, 14 to render the ring 13 freely rotatable.

At diametrically opposite points the ring 13 has formed thereon, or suitably rigidly attached thereto, a pair of bearing lugs 16, 16 within which are journaled the ends of a horizontal shaft 17. Journaled on this shaft for free rotation with respect thereto, as by means of anti-friction roller bearings 18 is a combined steering and traction wheel 19. The hub portion of this wheel preferably is hollow to contain grease for the lubrication of the bearings 18, and in order to prevent escape of the grease suitable sealing rings 20 are provided to surround the shaft 17 and to contact with the wall of the bore of the wheel hub outwardly of the bearings 18.

As is apparent, by means of the foregoing construction the wheel 19 is rotatable on its own horizontal axis for traction purposes and is rotatable with the ring 13 about a vertical axis for steering purposes. Thus, in carrying out the present invention, a horizontally disposed ring 21, provided with peripheral sprocket teeth, is suitably secured to the ring 13, while a vertical steering shaft 22, journaled for rotation in a suitable bracket 23 rising from the base A, is provided at its lower end, below said base, with a cooperating sprocket wheel 24, means indicated generally at 25 being provided for rotating the shaft 22, and a chain 26 being provided to connect the sprockets 21, 24 whereby rotation of said shaft effects steering rotation of the ring 13 and the wheel 19 as is manifest.

Resting upon the upper end of the ring 13 and suitably secured thereto for rotation therewith, is a supporting member which may preferably be a hollow, annular casting 27 provided preferably with a downwardly directed flange 28 snugly fitting within said ring to assist in holding the casting against lateral movement. At diametrically opposite points this casting is provided with recessed lugs or housings 29, 29 within which are arranged roller or other anti-friction bearings 30, 30 rotatably supporting a horizontal shaft 31 to which is fixed, between said bearings, a sprocket wheel 32.

The combined steering and traction wheel 19 has fixed thereto a sprocket wheel 33, and connecting this sprocket wheel with the sprocket wheel 32 is a chain 34 whereby rotation of the shaft 31 effects rotation of the wheel 19 about its own axis for traction purposes.

One end of the shaft 31 projects outwardly beyond the side of the casting 27 and has keyed thereto a pair of spaced clutch disks 35, 35, the inner of which is held against inward movement along said shaft by a collar 36 and the outer of which is constantly urged inwardly by a spring disk 37 interposed between an annular outwardly directed rib 38 on said disk and an adjustable stop or abutment in the form of a nut 39 threaded on said shaft.

Journaled on the shaft 31 for free rotation with respect thereto, between the clutch disks 35, 35, is a cooperating clutch member in the form of a combined clutch disk 40 and spur gear 41, suitable friction material 42 preferably being interposed between each side of the disk 40 and the inner faces of the disks 35, 35, respectively, whereby, under normal conditions, rotation of the disk 40 is effective to impart rotation through the disks 35, 35 to the shaft 31 thus to effect rotation of the wheel 19.

Mounted on the casting 27 is an electric motor 43 on the shaft of which is secured a spur pinion 44 disposed in mesh with the spur gear 41. Current is adapted to be supplied to said motor in all positions of rotation thereof in any suitable or desired manner, and as is manifest when said motor is in operation, power will be transmitted to the wheel 19 under all ordinary conditions to effect travel of the car. If, however, the wheel 19 meets with a resistance to turning thereof which is greater than the frictional engagement between the respective clutch disks, the clutch will slip and thus avoid harm either to the motor or to the drive mechanism. Obviously, by adjusting the nut 39 to vary the flexure of the disk 37 with consequent variation in the amount of frictional engagement between the disks 35—35 and 40, the amount of resistance which the wheel 19 must encounter before slippage of the clutch occurs may be predetermined.

A simple and practical arrangement whereby current may be supplied to the motor 43 in all portions of rotation thereof may consist of a bracket arm 45 secured to the casting 27 and carrying a block of insulation on which is mounted a contact plate 46 connected by a conductor 47 with the motor, in conjunction with a resilient contact wiper 48 engaging said contact plate and having connected therewith the current supply conductor designated as 49.

From the foregoing, it is apparent that due to the motor 43 being mounted on the casting 27, which latter may be formed either integrally with the ring 13 or separate therefrom, as shown, all of the weight of the drive mechanism is supported by the wheel 19. Moreover, it is apparent that the structural arrangement is simple, compact, strong and durable and capable of quick and easy assembly and disassembly.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:—

1. Mechanism of the character described comprising, in combination with a vehicle base having a hole therein, a sleeve mounted in said hole, a ring rotatably mounted in said sleeve, a combined steering and traction wheel rotatably mounted on said ring, a casting fixed with respect to said ring, a horizontal shaft journaled in said casting, a drive connection between said shaft and said wheel, a motor mounted on said casting, and a drive connection between said motor and said shaft inclusive of a slip clutch.

2. Mechanism of the character described comprising, in combination with a vehicle base having a hole therein, a sleeve mounted in said hole, a ring rotatably mounted in said sleeve, a combined steering and traction wheel rotatably mounted on said ring, a sprocket wheel fixed to said first mentioned wheel, a casting fixed with respect to said ring, a shaft journaled in said casing, a sprocket wheel carried by said shaft, a chain connecting said sprocket wheels, a motor carried by said casting, and a drive connection between said motor and said shaft inclusive of a slip clutch.

3. Mechanism of the character described comprising, in combination with a vehicle base having a hole therein, a sleeve mounted in said hole, a ring rotatably mounted in said sleeve, a rotatable combined steering and traction wheel mounted on and carried by said ring, a supporting member fixed with respect to said ring, a horizontal shaft journaled in said supporting member, a drive connection between said shaft and said wheel, a motor mounted on said supporting member, and a drive connection between said motor and said shaft.

4. Mechanism of the character described comprising, in combination with a vehicle base having a hole therein, a ring rotatably supported by the base and extending through said hole, a combined steering and traction wheel rotatably mounted on said ring, a casting fixed to said ring, a horizontal shaft journaled in said casting, a drive connection between said shaft and said wheel, a motor mounted on said casting, and a drive connection between said motor and said shaft.

In testimony whereof I hereunto affix my signature.

FRED L. MARKEY.